Patented Nov. 9, 1948

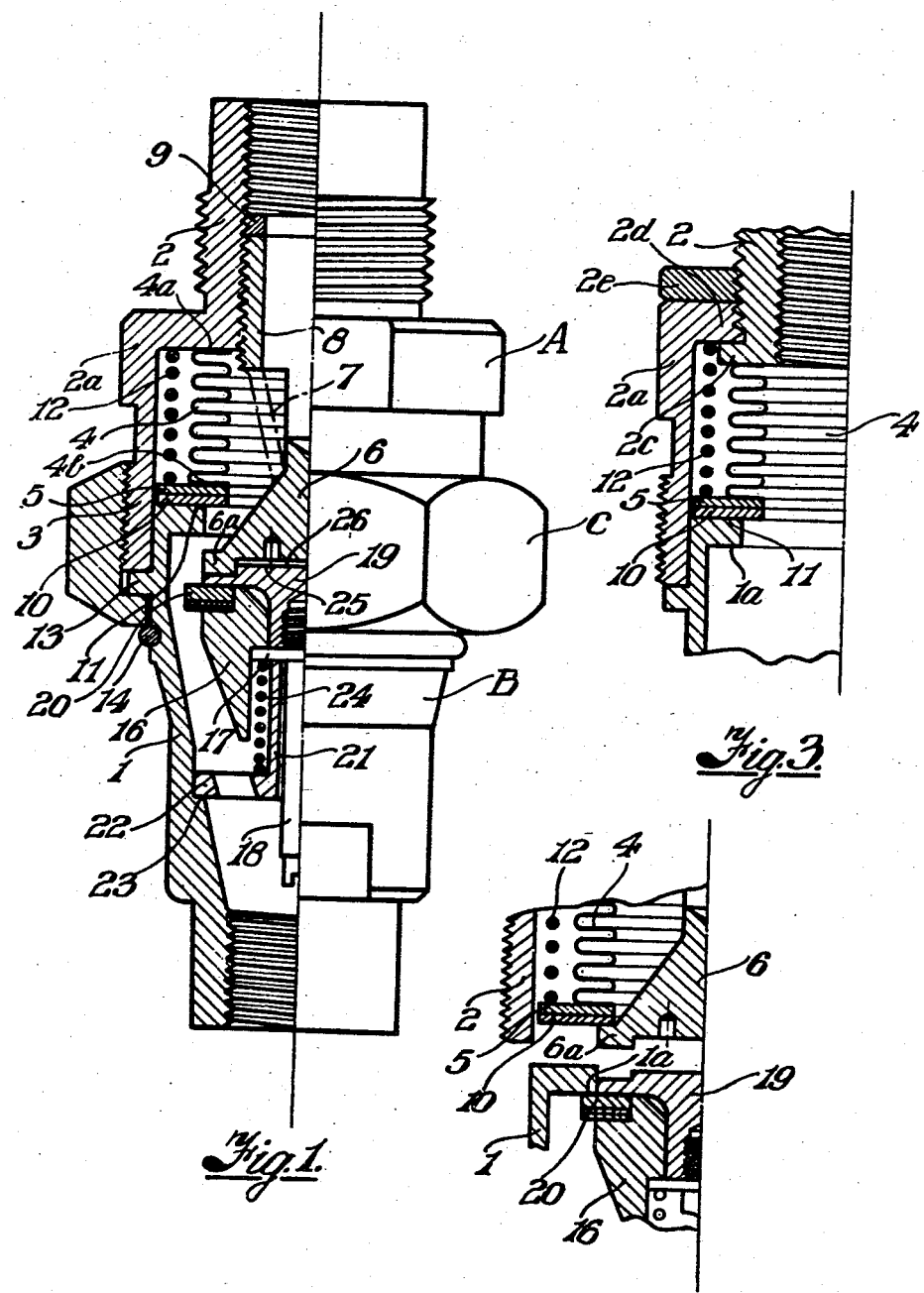

2,453,389

UNITED STATES PATENT OFFICE 2,453,389

SELF-SEALING PIPE COUPLING

Percival Edward Thomas, Worcester Park, England, assignor to Sterling Industries Limited, London, England, a British company Application June 3, 1946, Serial No. 673,926
In Great Britain May 14, 1945

4 Claims. (Cl. 284—19)

This invention relates to improvements in self-sealing pipe couplings and without any limitation whatsoever is more particularly intended for relatively low pressures, but wherein the fluid may be hot or very hot.

The object of the invention is to eliminate liability of leakage in the respective valve sealed pipe terminals and provide valve seatings of such character that they are unaffected by hot hydrocarbons or other fluids, which may equally be solvents or of aqueous nature such as superheated water in liquid phase.

The invention consists in a self-sealing pipe coupling wherein both pipe terminals are automatically sealed on disconnection and opened to fluid flow on coupling and wherein on coupling a fixed valve part of one terminal member displaces a mobile valve part of the other terminal member characterised that a resilient collapsible metal bellows constitute an extensible fluid tight wall to the pressure fluid within that terminal member otherwise most subject to leakage.

The invention further comprises the arrangement whereby the resilient collapsible bellows is permanently attached at its one terminal to a fixed part of the coupling and at its other and mobile terminal permanently secured to a metal ring, said ring being faced with a slightly yielding material and impelled under spring pressure to constitute a fluid closure seal to one part of its area when the coupling is in its coupled state or to act as a valve and fluid closure over the other part of its area when the coupling is in an uncoupled state.

The facings for the said valve seatings for each mobile part consist of an inorganic material such as woven spun glass, asbestos or asbestos compounded with a heat resistant synthetic organic plastic or of carbon, said facing being applied to a metal ring and the whole consolidated by spraying or electro depositing a thin layer of copper, silver, or like metal over both ring and material applied thereto.

In forming the valve seatings the metal sprayed to form a consolidating binder may depend upon the temperature level of the fluid to be carried in the pipe fitted with the self-sealing couplings according to the invention. Thus, if temperatures up to 250–300° C. are used, zinc may be employed, the material being either powdered with reduction in dry hydrogen applied to the braided glass annulus and sintered and the manufactured zinc coated annulus soldered to its metallic seating, and its operative face turned or preferably ground to provide a true seating. In the lower range of temperature tin, tin lead alloys may be used, whilst in the higher range copper will satisfy requirements up to 1000° C. We have further ascertained that if a braided ring or annulus of spun glass is impregnated with a high quality carbon such as graphite, the said rings can be electroplated with copper, brass, silver or like metals that lend themselves to economic electrolytic transfer, and which produce a seating that can be tool faced and has sufficient resilience or softness to ensure even contact when coupling or uncoupling ensues, with slight discrepancies in mechanical alignment of valve part and valve seating, whilst being themselves impervious in their substance to fluid flow.

To compel valve closure on uncoupling springs are applied either external to or internal of the resilient bellows forming the fluid wall of the coupling parts, or again, and alternatively or in addition the pressure of the fluid within the pipe may be employed to tend to close the valves, said pressure acting in parallel with the coiled springs and resilient bellows.

In order that the invention shall be better understood reference is made to the accompanying drawings wherein:

Fig. 1 is a part sectional vertical elevation of a self-sealing coupling according to a preferred form of the invention illustrated in its coupled state, Fig. 2 shews a fragment of the device illustrated in Fig. 1 with the coupling parts in their sealed and uncoupled condition in part sectional elevation, Fig. 3 shews in section a fragmentary part of the said coupling as Fig. 1 with detail of metallic bellows to an enlarged scale.

Referring to the drawing and to Figs. 1 and 2 the coupling consists of two parts, i. e. part A which is coupled to part B by a cramping nut C. The part A has a mobile seating and fixed valve member whilst part B has a mobile valve and a fixed seating. Part B has a continuous body part 1, and there is therefore no likelihood of fluid escape on coupling or uncoupling, whilst part A has a flexibly continuous interior within assembled body parts 2, 2a, the skirt 3 of which latter is threaded for intercoupling of the two parts A and B by nut C. Thus said part A without the facilities of the present invention would depend upon two or more annular joints for security against leakage, and for that reason part A is provided with an expansible metal bellows 4 secured to the body part 2 of part A at one terminal and to a metal annulus 5 at its other terminal. Part A carries a valve member 6 carried by a perforate spider 7, said spider springing from the inner tubular side wall of casing 2, or alternatively as shewn from a tubular member 8 fast with said side wall as by threading and engaging a sealing ring 9 recessed into the inner wall of casing 2. The bellows 4 is an extensible and compressible part of known construction fabricated preferably from stainless steel, Monel metal or the like corrosion resisting material. The said bellows may be inherently resilient or otherwise. One terminal 4a of said bellows is brazed or welded to the inner turned face of casing 2 whilst its other terminal part 4b is brazed or welded to a steel ring or flat metal annulus 5 and is made fast to or composite with a bonded valve seating face ring 10 composed of spun glass, carbon, asbestos or like heat and corrosion resisting material which for high temperatures, is treated with a solution of copper sulphate, silver nitrate or like electrically conducting fluid and the steel ring 5, and seating 10 lightly electroplated with copper, silver or like high melting point material, the plating process bonding the then slightly resilient valve seating 10 to the rigid metal annulus 5. The working face of the seating 10 is adapted on coupling of parts A and B to engage the fixed valve face 11 of part 1. A coiled spring 12 disposed externally of the bellows 4 takes abutment between the under face of part 2, and upper face of metal annulus 5.

In the fully coupled state as shewn the mouth of coupling part 2a engages the stop flange 13 under the operation of the threaded coupling nut C. A circlet ring 14 may be provided on part 1 as a security device against the nut C slackening off due to vibration or other cause. Part B of the coupling has a mobile valve member 16 formed as a hollow conical body internally recessed to engage a flanged seat 17 formed on spindle 18 said spindle being screwed into the locking plug 19 said plug 19 is flanged and engages the valve seating ring member 20 which latter is fabricated in the like manner to that secured to the bellows member 4.

Spindle 18 is mounted within a tubular support 21, said support having a perforate flange 22 recessed as at 23 into the metal of the casing 1 of part B. Between the skirt of valve member 16 and the outer wall of support 21 is disposed a spring 24. The plug 19 is spigotted as at 25 into a corresponding recess 26 is fixed valve member 6, said member 6 being provided with a flanged rim adapted to engage the underside of valve seating 10 upon uncoupling.

To facilitate assembly the housing of part A may be made as shewn in Fig. 3, wherein the pipe coupling part 2 is formed with a flange 2c whilst the valve housing part 2a is flanged inwardly at 2d and screwed to part 2. The assembly is locked by nut 2e and the lock nut and part 2a may be keyed together to prevent any separation when connecting parts A and B by cramp nut C.

The operation of the invention is as follows: When the device is in its uncoupled state the parts A and B are both fluid tight entities, the part A is sealed by the outer flange 6a of fixed valve 6 engaging the inner and under area of the packing ring 5 whose faced portion 10 seals the valve from any leakage under resilient pressure from the bellows 4 if any and spring 12. Whilst part B is sealed by the packing ring 20 on mobile valve 16 engaging the valve seating 1a in the valve housing 1. This self-sealing is automatic when the parts A and B are brought together for coupling the spigot 25 of part 19, is inserted in the socket 26 of part 6 and the cramping nut C threaded home on coupling housing part 2. This has the effect of opening a fluid passage way through the two part coupling as shewn in Fig. 1. The operation of cramping moves part 1 with the interior of piece 2 and compressed the bellows 4 and spring 12 the sealing ring 10 engaging the upper seating face of part 1. The fixed valve 6 remains in contact with the upper part of plug 19 of mobile valve 16, the latter being forced back, away from the valve seat 1a, and finally occupies the position shewn, allowing through the coupling a free path for fluid circulation.

The above type of self-sealing valve coupling according to the invention can be used for high or very high temperature and pressures, e. g. in oil cracking and synthetic oil production plants, where the pressure may be of the order of 250 lbs. to 3000 lbs. per square inch, and the temperature in the neighbourhood of 1000° F., and wherein creep stressed tend to vitiate the elasticity of metal.

I claim:

1. In a self-sealing coupling construction including conduits, means for coupling together the ends of the conduits, a movable valve element and a fixed seat member therefor in one of said conduits, a movable valve seat element and a fixed valve member therefor in the other of said conduits, and resilient means biasing said elements to conduit closing position in engagement with the respective members, the element of one conduit abutting the member of the other to establish a passageway when the conduits are coupled; the improvement wherein the movable valve seat element is a flat annulus having an outer portion coacting with the fixed valve seat member in passageway-establishing position and an inner portion coacting with the fixed valve member in conduit-closing position, wherein the resilient means biasing said movable valve seat element is a coil spring which bears against said outer portion of said annulus and wherein a flexible, resilient, leak-proof, tubular bellows, concentric to but within the coil spring, connects the inner portion of the valve seat element to a portion of the respective conduit.

2. A self-sealing coupling construction as claimed in claim 1 wherein the flat annular movable valve seat element is a laminated structure including a nonmetallic part for coaction with the respective valve member and a metallic part bonded thereto and connected to the bellows.

3. A self-sealing coupling construction as claimed in claim 2 wherein the nonmetallic portion of the movable valve seat element is faced with a yielding refractory material and is bonded to the metal ring by a film of soft metal.

4. A self-sealing coupling construction as claimed in claim 1 wherein the conduit having the movable valve seat element therein is comprised of a tubular portion and a housing portion and wherein means are provided for connecting said portions together, the coil spring extending between the housing portion and the movable valve seat element while the bellows extends between the tubular portion and the movable valve seat element.

PERCIVAL EDWARD THOMAS.

REFERENCES CITED

The following references are of record in the file of this patent:

UNITED STATES PATENTS

| Number | Name | Date |
|---|---|---|
| 858,504 | Ekert | July 2, 1907 |
| 1,370,128 | Kraft | Mar. 1, 1921 |
| 1,937,461 | Mylting | Nov. 28, 1933 |
| 2,149,974 | McCormack | Mar. 7, 1939 |
| 2,319,015 | Speth | May 11, 1943 |
| 2,337,096 | Geiger | Dec. 21, 1943 |